June 23, 1942.   F. E. HAZARD   2,287,681
REFRIGERATING DEVICE FOR BOTTLED BEVERAGES
Filed July 3, 1935   4 Sheets-Sheet 1
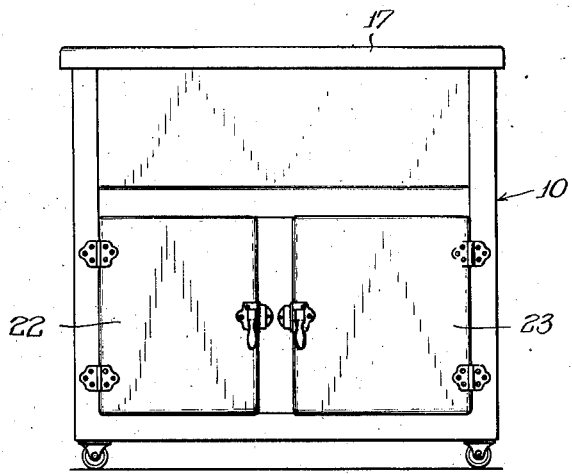
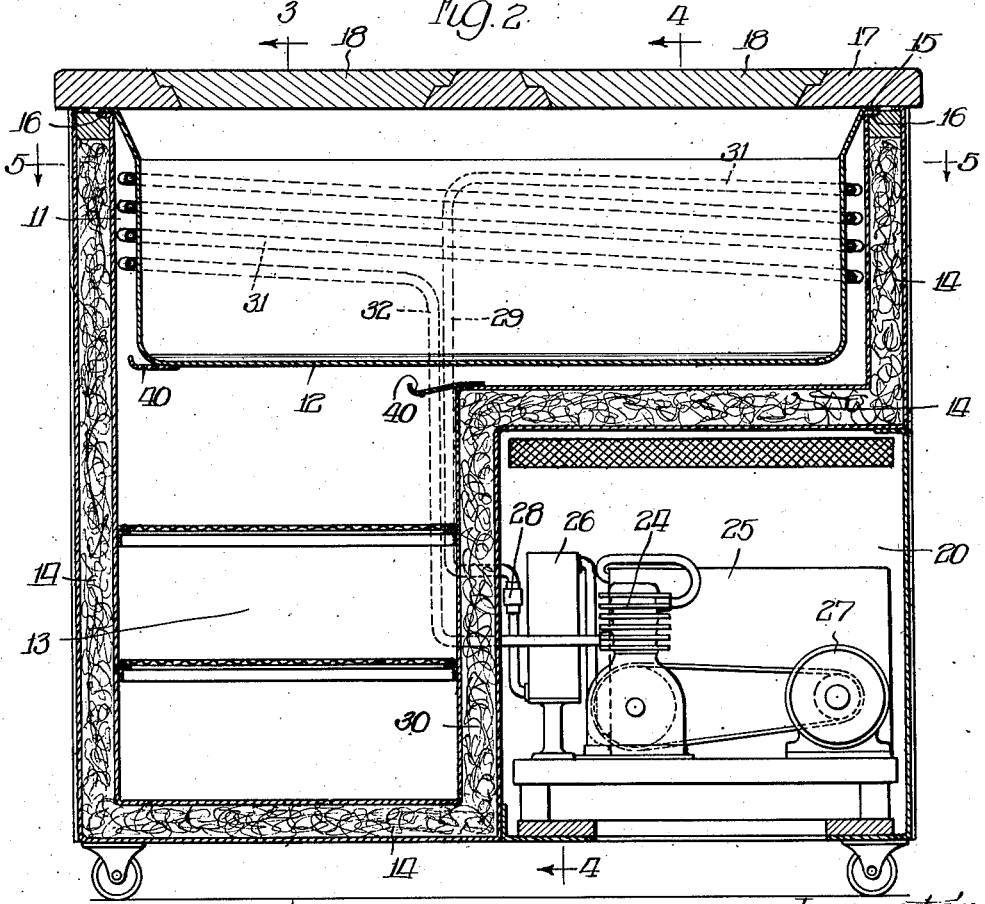
Inventor:
Frederick E. Hazard, June 23, 1942.                F. E. HAZARD                2,287,681
             REFRIGERATING DEVICE FOR BOTTLED BEVERAGES
                    Filed July 3, 1935           4 Sheets-Sheet 2
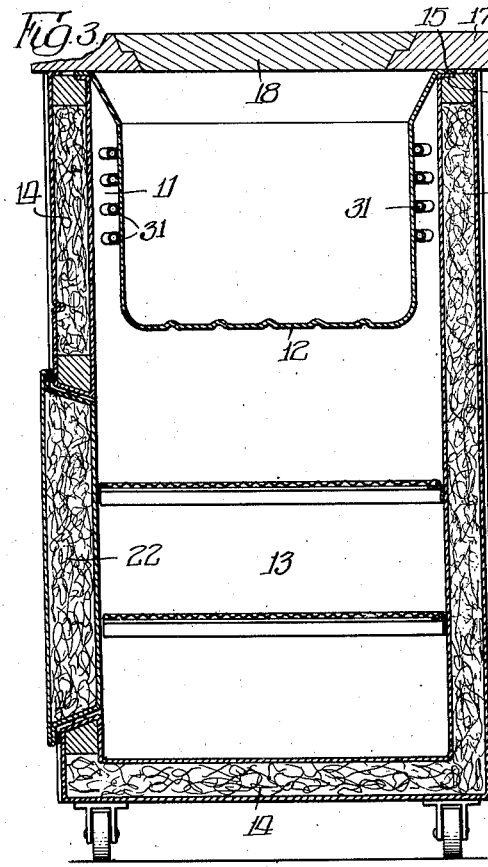
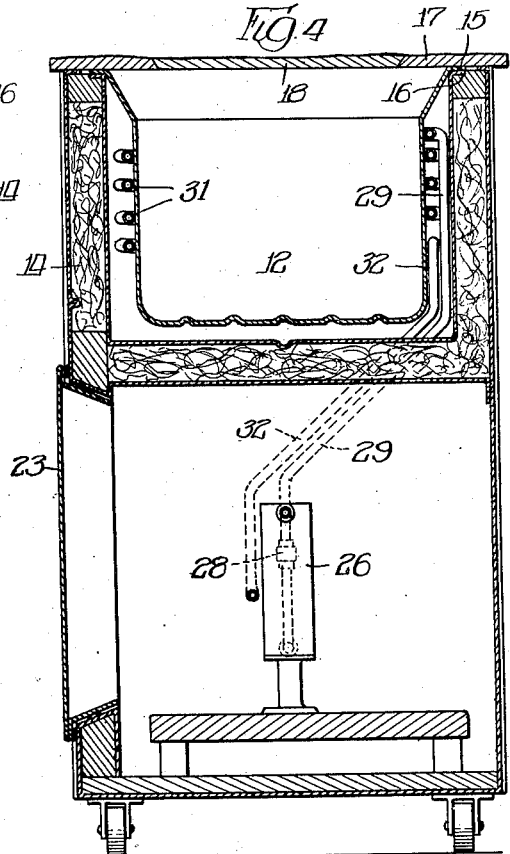
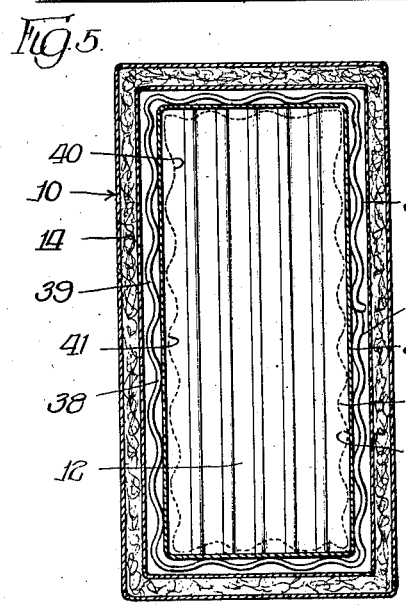
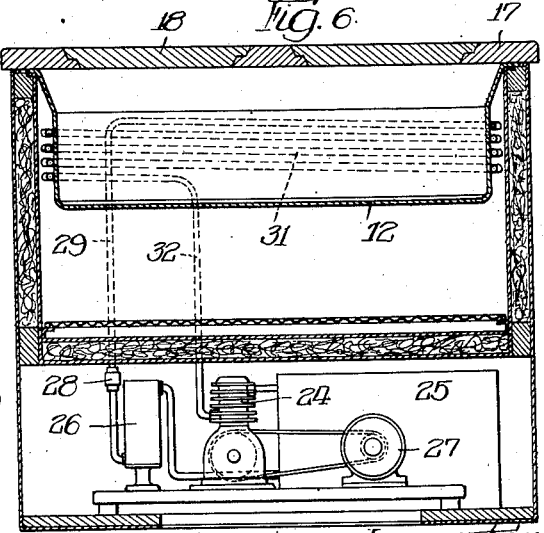
Inventor:
Frederick E. Hazard,
By Wilkinson, Huxley, Byron & Knight
Attys.

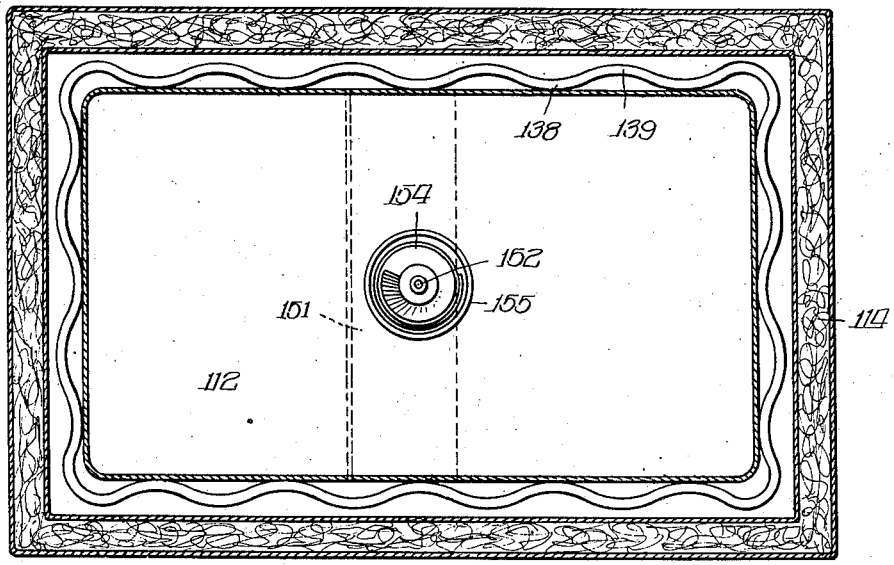
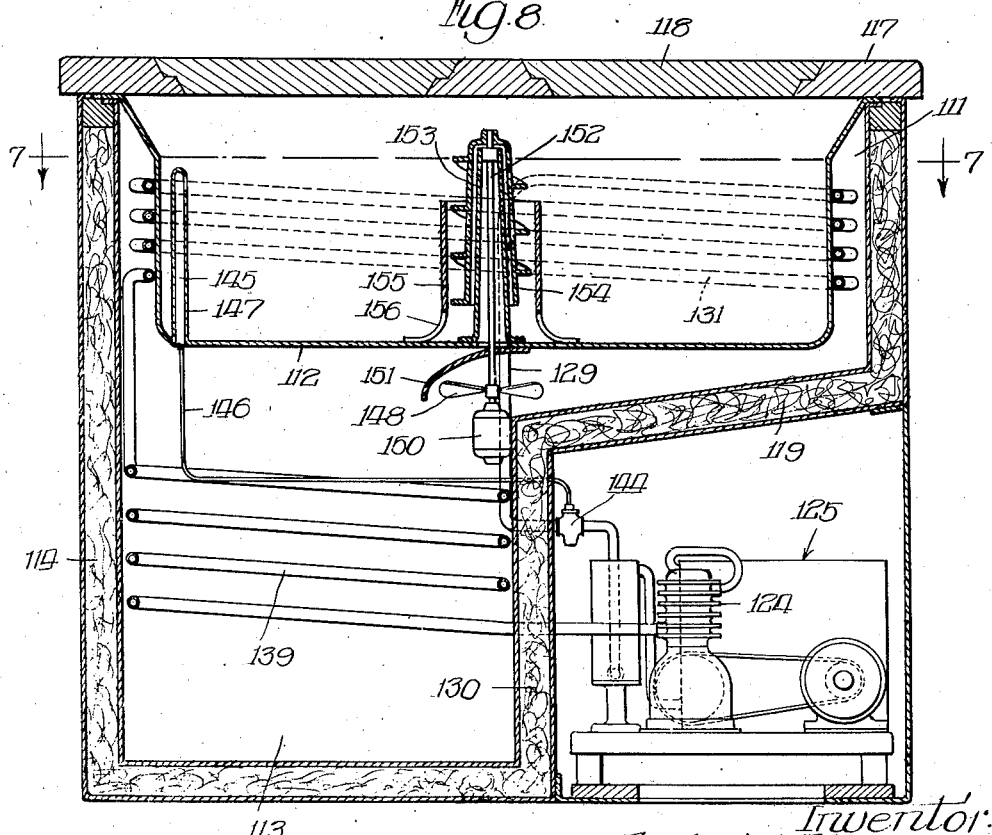

June 23, 1942.    F. E. HAZARD    2,287,681
REFRIGERATING DEVICE FOR BOTTLED BEVERAGES
Filed July 3, 1935    4 Sheets-Sheet 4
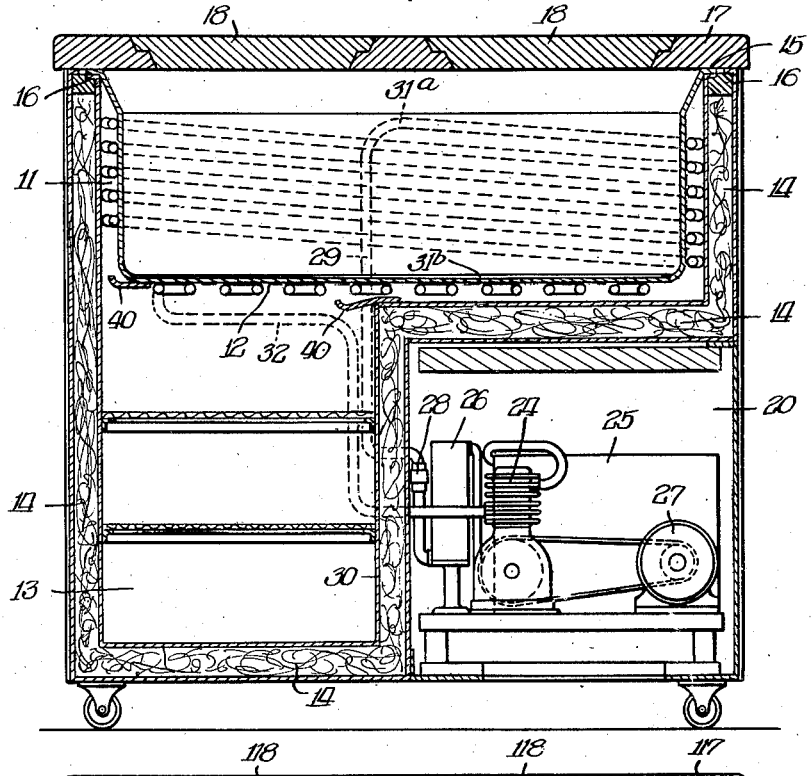
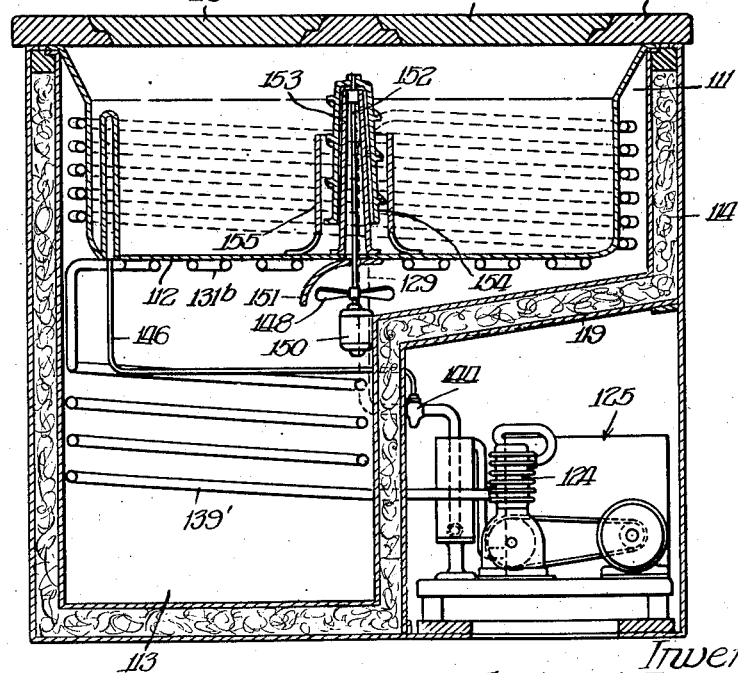
Inventor:
Frederick E. Hazard Patented June 23, 1942

2,287,681

UNITED STATES PATENT OFFICE 2,287,681

REFRIGERATING DEVICE FOR BOTTLED BEVERAGES

Frederick E. Hazard, Chicago, Ill.

Application July 3, 1935, Serial No. 29,600

27 Claims. (Cl. 62—128)

This invention relates to a new and improved refrigerating device particularly designed and adapted for refrigerating bottled beverages and includes as essential elements, a container or more specifically, an immersion tank, for containing and refrigerating bottled beverages and like articles, and a dry refrigerating compartment which may be used as a pre-cooler for the bottled beverages or other articles.

It is an object of this invention to provide in a refrigerating device of the type above referred to, an arrangement or system including the immersion tank, associated refrigerating coils and the dry cooling compartment whereby when in use, an appreciable quantity of ice will be formed in the immersion tank and will be caused to be released or broken away so as to float on the surface of the immersion liquid.

In connection with this feature of operation of the device it may be stated that it is highly desirable in the sale of bottled beverages which are refrigerated in an immersion liquid to provide an appreciable quantity of ice which will float on the surface of the liquid, as this is evidence of the low temperatures maintained in the refrigerating liquid. It has been found in practice, that bottled beverages which are immersed in a liquid having ice floating on the surface thereof are immediately recognized as being at the desired low temperature and thus beverages which are so maintained have a relatively high sales appeal.

This invention proceeds upon the principle of having an immersion tank located in an elevated compartment surrounded by insulated walls and which is provided with cooling or refrigerating coils positioned around the outside thereof and in contact with said immersion tank and of having in communication therewith, a second compartment which will be utilized as a dry cooling compartment in the nature of the cooling spaces of an ordinary household refrigerator. The invention also utilizes free or controlled passages for the travel of convection currents of air from the lower compartment to the upper compartment and the action of these convection currents has an important function in the operation of this device.

A further feature of this invention concerns the arrangement of the coils on the outside of the immersion tank, and which are coextensive with that portion of the tank containing the immersion liquid. Preferably, the coils are arranged so as to contact the surface of the immersion tank at spaced locations to provide a maximum refrigerating action at said locations. With a construction of refrigerating cabinet as above outlined, it has been found that during operation the liquid in the immersion tank will partially freeze, resulting in the formation of ice adjacent the wall of the immersion tank which ice is thicker at the locations where the cooling coils contact the surface of the immersion tank. This ice is formed during the operation of the refrigerating unit and continues until the usual automatic control operating under the influence of the desired low temperature functions to shut off the refrigerating unit.

During the subsequent period when the refrigerating unit remains inoperative, the air from the dry refrigerating compartment located below the immersion tank which ranges in temperature approximately 10 degrees higher than the temperature of the liquid in the immersion tank, is caused, by the laws controlling convection currents, to rise and contact the sides of the immersion tank throughout the space surrounding the same and occupied by the cooling coils. This gradually raises the temperature of the walls of the immersion tank, with the result that the ice is caused to melt and free itself from the inner wall of the tank. This function is aided by the particular formation of the ice which is very thin at the locations where the coils are not in contact with the walls of the tank. Thus various pieces of ice float up from the sides of the tank and remain floating on the surface of the immersion liquid. After the temperature has raised sufficiently for the freeing of all the ice as above described, the automatic controls again operate to start the refrigerating unit, whereupon more ice is made and the cycle is repeated.

With this understanding of the basic principles involved in this invention, reference will now be made to the following description of one illustrative embodiment thereof which may be better understood by referring to the accompanying drawings, in which:

Figure 1 is a front elevational view of one form of the refrigerating cabinet as it may be built when embodying the present invention;

Figure 2 is a front elevational view in cross section of the cabinet shown in Figure 1 disclosing the interior construction thereof;

Figure 3 is an elevational view in cross section taken on the line 3—3 of Figure 2, and looking in the direction of the arrows;

Figure 4 is an elevational cross sectional view taken on the lines 4—4 of Figure 2 and looking in the direction of the arrows;

Figure 5 is a cross sectional plan view taken on the line 5—5 of Figure 2 and showing the arrangement of the coils around the immersion tank;

Figure 6 is a front elevational view in cross section of a modified form of the present invention;

Figure 7 is a cross sectional plan view taken on line 7—7 of Figure 8 and showing the provision of means for circulating the liquid in the tank;

Figure 8 is a front elevational view in cross section of the refrigerating device of the invention showing the provision of means for circulating the air between compartments and which also drives the water circulating means;

Figure 9 is a front elevational view in cross-section of a refrigerating device corresponding essentially to that shown in Figures 1 and 2 of the drawings, but disclosing certain modifications in the construction thereof; and Figure 10 is a front elevational view in cross-section of a refrigerating device corresponding essentially to that shown in Figures 7 and 8 of the drawings, but disclosing certain modifications in the construction thereof.

By referring to the drawings, it will be noted that the device here illustrated comprises a cabinet designated generally 10. This cabinet is provided with an upper compartment 11, in which there is mounted a container or immersion tank 12 for holding an immersion liquid and bottled beverages or the like, to be refrigerated. Below the compartment 11 and in this form, under one end thereof, is a second compartment 13, which is adapted to be used as a dry refrigerating compartment in the manner of an ordinary household refrigerator. These compartments are surrounded by insulated walls 14 which may be of any suitable construction as now commonly employed in devices of this type. The immersion tank is preferably mounted by flanging outwardly as at 15, the upper edge thereof which is secured to and supported by the upper edge 16 of the cabinet wall. The immersion tank is closed by a top 17 of suitable insulating material and having the usual type of insulated removable covers 18, conveniently placed thereon.

In the construction shown in Figure 2, with the dry compartment underlying only one end of the upper compartment, a space 20 is provided for housing the refrigerating unit. The refrigerating unit per se, constitutes no part of the present invention and therefore, it is only diagrammatically represented as at 21.

As shown in Figure 1, the dry refrigerating compartment is accessible from a door 22, which is pivoted on the front thereof and the refrigerating unit is accessible from the corresponding door 23. The refrigerating unit includes a compressor 24, having connection to a condenser 25 which joins with a receiver 26, the compressor being driven by a motor 27. The receiver 26 is connected to an expansion valve 28, which in turn, is connected to supply pipe 29 passing through the insulating wall 30 which separates the refrigerating unit from the dry refrigerating compartment 13 and thence upwardly to comprise the coil 31 which extends around the sides of the immersion tank 12. This forms the evaporator of the refrigerating apparatus and it is to be understood that the coils may extend only partially down the sides of the immersion tank or they may extend all the way to the bottom thereof and even to underlying the bottom of the tank. The essential feature is that the coils be associated with the walls of the tank throughout that portion which is occupied by the immersion liquid.

It is obvious that the cooling coil may, in addition to refrigerating the immersion tank and the dry refrigerating compartment, also be utilized for other refrigerating purposes and in such event, the coil may be extended to serve as a cooling coil for a water cooler, ice cream compartment or any other type of device which may be conveniently associated with this type of cabinet.

The coil 31 connects with a suction return pipe 32 which extends downwardly and thence through the insulating wall 30 back to the compressor 24.

In Figure 9 is disclosed a refrigerating device corresponding essentially to the device above described and shown in Figures 1 and 2, and accordingly similar parts have been referred to by corresponding reference numerals in this figure. The device in Figure 9, however, varies from that shown in Figures 1 and 2 in that the supply pipe 29 leads into the coil 31a which, although extending around the sides of the tank 12, is continued as coil 31b disposed to underlie the bottom of said tank. This coil 31b, of course, is connected to the suction return pipe 32 which extends downwardly and through the insulating wall 30 back to the compressor 24.

As shown in Figure 5, it is preferable to arrange the coils around the sides of the tank substantially in the manner shown, that is to say, with certain portions thereof as at 38, in contact with the walls of the tank and intervening portions thereof as at 39, spaced from the walls of the tank. Due to the greater heat conductivity at the location 38 where the coils touch the tank, when the refrigerating unit is in operation, ice will be formed along the inner walls of the immersion tank substantially as shown at 40. It will be noted that the ice is relatively thick immediately opposite the locations 38 and is relatively thin as at 41 opposite the locations 39. The result of this type of ice formation is that during the interim when the refrigerating unit is not in operation and the warmer air rising from the dry refrigerating compartment 13 contacts and warms the walls of the immersion tank, the ice at the locations 41 melts away while at the same time, the pieces of ice resulting from the thicker portions 41, free themselves from contact with the inner walls of the tank. This produces a plurality of elongated pieces of ice which eventually float on the surface of the immersion liquid.

It will be noted from the above description that the essential feature of this invention in addition to the arrangement of the coils is the provision of a dry compartment below the immersion tank compartment.

Accordingly, this invention contemplates all types of constructions and arrangements where this relationship may be realized. For instance, in Figure 6, there is shown a modified arrangement with the dry compartment 13 located over the refrigerating unit but underlying the immersion tank. Furthermore, it is conceivable that in the type of device shown in Figure 2, that the dry compartment may underlie the entire immersion tank compartment with the refrigerating unit placed elsewhere externally of the cabinet.

In operation, it is to be understood that the refrigerating unit will have the proper and usual control devices for starting and stopping the unit at the upper and lower temperature extremes to which the device is adjusted. This control can operate from either the upper or lower compartment. Furthermore, it will be realized that some heat will enter the cabinet when the covers 18 are removed to withdraw bottled beverages and that also, the temperature of the lower compartment 13 will be raised during use through the opening of the door 22 for putting in and taking out objects to be refrigerated or pre-cooled.

In practice it is found that the unit can be conveniently adjusted to maintain a temperature in the immersion liquid of approximately 33 degrees and with the body of the liquid at this temperature the coils will be sufficiently cold to produce ice on the walls of the immersion tank substantially as above described. This temperature is very desirable for most bottled beverages such as carbonated soft drinks and the like. With the temperature of the immersion tank adjusted as above indicated, it is found, with the construction shown in Figure 2, that the dry ice compartment is maintained at approximately 10 degrees higher or in the neighborhood of 43 degrees. This temperature is ideal for pre-cooling the bottled beverages to be subsequently placed in the immersion tank and when they are so pre-cooled the heat removing function of the immersion tank is reduced to its most efficient basis.

Furthermore, the temperature of approximately 43 degrees is ideal for the temperature of bottled beer and other beverages which are preferably sold at a slightly higher temperature than that of carbonated soft drinks. Likewise, this is an ideal temperature for ordinary refrigerating purposes, for milk, food, butter, cheese, and the like.

Another desirable feature of this device resides in the fact that the cooling coils which have relatively large volume, present a quantity of cooling fluid which enables the use of higher refrigerant temperatures. Thus no part of the apparatus produces a temperature sufficiently low to cause appreciable condensation and thus the objectionable drying out effect common with many refrigerators is not present in this device. For collecting and carrying away such condensation as there might be when operated under very humid conditions, collectors 40, may be provided to prevent the deposition of condensation moisture into the lower dry cooling compartment.

As previously stated, it is very desirable to have a quantity of ice floating on the surface of the immersion liquid since the same is visible evidence of the low temperatures being used to cool the bottled beverages which has proven a good sales appeal. In the present cabinet, ice is always visible as alternating freezing and the thawing cycles are repeated as long as power is supplied to the refrigerating apparatus. The ice particles floating in the immersion liquid also have a valuable refrigerating function in maintaining the liquid at a uniform and even temperature and in addition, they will maintain the low temperatures in the liquid for an appreciable time, providing a "holdover" in case of power discontinuance or other physical difficulties which might disrupt the operation of the refrigerating apparatus.

The arrangement of the cooling coils surrounding the immersion tank and which have contact with the walls of the tank at spaced locations functions to increase the freezing effect at these locations and the formation of ice is therefore greater in thickness at these points than at the points therebetween. In fact, ice will form at these spaced locations to a thickness of an inch or so, before any appreciable freezing of the liquid will take place at the locations therebetween. It is possible to further localize the freezing of the liquid within the tank by insulating the walls thereof on the outside between those locations where the coils have contact with the walls. Of course, spacing the coils utilizes the air as an insulating medium but this insulating effect can be increased by using well known insulating materials.

Although the foregoing method of ice formation is preferred the invention, nevertheless, contemplates a construction of immersion tank and cooling coils where uniform freezing of ice along the sides of the tank will take place. A subsequent thawing of the ice is of course required to cause the same to separate and float on the surface of the immersion liquid. In the present cabinet, the space between the insulating walls thereof and the cooling coils is relatively narrow for the express purpose of increasing the velocity of the air currents which flow from the lower compartment to the upper compartment where they contact the walls of the immersion tank to gradually raise the temperature of the tank to produce a thawing of the ice previously formed during the interval of operation of the refrigerating apparatus. It is understood that this circulation of air or convection currents from the lower to the upper compartment may be controlled by baffles or other means but it has been found that these can be practically eliminated in the construction shown in Figure 2. In this arrangement, the location of the lower compartment with respect to the immersion tank insures proper circulation of the air and convection currents to accomplish the desired warming of the walls of the tank.

The tank 12 can also be utilized as a container for bottles with the tank being maintained dry. In this aspect of the invention the tank and lower compartment both function as dry refrigerating means and the production of freezing and thawing cycles is not involved. It is likewise possible to use the tank for refrigerating bulk liquids such as milk and the like in which case the lower dry refrigerating compartment performs the functions of an ordinary refrigerator.

The form of refrigerating device shown in Figures 7 and 8 is similar in substantially all respects to that of Figure 2. The several modifications in design have to do with positive control of the circulation of air within the cabinet and circulation of the water within the immersion tank. The cabinet essentially provides an upper compartment 111, a lower compartment 113, which compartments are formed by the insulated walls 114. The cabinet is closed by a top 117 having the removable covers 118 which permit access to the immersion tank 112 located in the upper compartment. The insulated wall 119, located over the refrigerating apparatus designated in its entirety by 125, has a decided slope so as to increase the space between said wall and the center of the immersion tank for purposes which will more particularly appear as the description proceeds.

The space between the insulated walls 114 and the side walls of the immersion tank is substantially occupied by a refrigerant evaporator in the form of a relatively long cooling coil 131, which coil may extend partially down the sides of the immersion tank or may extend all the way to the bottom or even underlie the bottom of the tank. Also as better shown in Figure 7 the coil is preferably arranged with certain portions as at 138 in contact with the side walls of the tank and intervening portions as at 139 spaced from the walls of the tank. It is particularly noted that the cooling coil is spaced from the rounded corners of the tank. Due to the greater heat conductivity at those points where the coil contacts the walls of the tank when the refrigerating unit is in operation ice will be formed on the inner walls of the tank at these locations and will be relatively thick compared to the formations of ice at the areas therebetween.

The cooling coil connects with the liquid refrigerant supply pipe 129 leading from the expansion valve 128 and at its opposite end continues to form a second cooling coil 139 located in the lower dry refrigerating compartment. The turns of said coil are located adjacent the insulated walls 114 and 130, the coil eventually connecting with the compressor 124, returning the evaporated refrigerant to the same. In this modification, by reason of the second cooling coil, this dry refrigerating compartment is maintained at a low temperature, which however, in operation will be maintained at a temperature somewhat higher than in the immersion tank 112. To insure alternate freezing and thawing of the liquid in the immersion tank as explained in connection with the operation of the cabinet of Figure 1, the present modification contemplates an expansion valve 144 having a bulb thermostat 145 connected by the capillary tube 146 to the expansion valve and which thermostatic bulb is housed within the metal sheath 147 extending within the tank so that the same is readily influenced by the temperature changes of the liquid in the tank. The operation of the expansion valve as controlled by the thermostatic bulb is as follows:

The liquid refrigerant is admitted to the coil which expands therein, producing a cooling effect and refrigeration of the liquid within the tank. This continues until ice is formed on the walls of the tank, the ice formations at the spaced locations 138 being thicker than the formation of ice on the areas therebetween. The effect of the low freezing temperatures on the thermostatic bulb will result in closing the expansion valve and the supply of liquid refrigerant to the coil therefore ceases. In time the temperature of the liquid within the immersion tank will rise to produce a thawing of the ice formations on the sides of the tank, whereupon the ice particles are liberated and float on top of the immersion liquid. The warming up of the liquid will also influence the thermostatic bulb but in this instance the action of the bulb is to open the valve, whereupon the cycle is repeated.

As shown in Figure 8 the invention also contemplates the provision of circulating means for controlling the circulation of air and convection currents between the lower and upper compartments. This may take the form of a fan 148 operated by a conventional electric motor 150. The motor is located adjacent the wall 130 and to accommodate the fan, it is desirable to taper the insulated wall 119, as shown, increasing the space between said wall and the bottom of the tank, particularly at the end of the wall where the fan is located. Also a baffle 151 may be fixed to the base of the tank 112 to insure controlled circulation.

In the modification shown the motor shaft 152 projects upwardly through the base of the tank and through the tube 153 which terminates above the level of the liquid within the tank. A screw 154 fixed to shaft 152 surrounds the exterior of the tube and therefore has rotation when the fan is operated to produce a circulation or agitation of the liquid in the tank. It is of course possible to replace the screw 154 with any other means for producing a similar function. Rotation of the screw will effect a downward flow of water in the vicinity thereof, which flow can be directed by the shroud 155 having openings 156 at the base thereof and which surrounds the screw, being slightly spaced therefrom. During operation of the liquid circulating means the liquid in the tank will be caused to flow downwardly through the shroud 155 and will be expelled at the base through openings 156 so that the general flow of liquid will be along the base of the tank radially from the shroud 155 up along the sides of the tank and then from the sides to the center where the action of the screw again propels the liquid downwardly as described.

The addition of a fan for positively circulating the air within the refrigerating cabinet reduces the condensation on the cooling coil and therefore practically eliminates the dripping of moisture from said coil. Controlling the circulation in this manner also aids in cooling the dry compartment as the air from the colder upper compartment is caused to immediately travel to the lower compartment and which is eventually again discharged to the upper compartment. This also affects the temperature in the upper compartment since the warm air from the lower dry compartment is delivered thereto and the thawing of the ice formations within the tank is facilitated as a result thereof. Controlling the circulation of the liquid within the tank by the provision of a pump or propeller screw has the desirable effect of increasing the rapidity of cooling of the bottles placed therein for refrigeration. The constant flow of the liquid from the center to the sides along the bottom of the tank and then back to the circulating means again also insures uniformity in temperature of the liquid.

In Figure 10 is disclosed a refrigerating device corresponding essentially to the device above described and shown in Figures 7 and 8, and accordingly similar parts have been referred to by corresponding reference numerals in this figure. In Figure 10, however, coil 131a, extending from supply pipe 129, extends around the sides of the tank and is continued to form coil 131b disposed to underlie the bottom of the tank. This coil 131b is then connected to the second cooling coil 139', which latter coil extends through the insulating wall into the compressor compartment and is connected to the compressor 124.

The invention is not to be limited to or by details of the construction of the particular embodiment thereof illustrated by the drawings, as various other forms of the device will of course be apparent to those skilled in the art without departing from the spirit of the invention or the scope of the claims.

What is claimed is:

1. In a refrigerating device, an upper compartment provided with a tank forming a container for bottled beverages and the like, a refrigerating compartment below said tank providing a pre-cooler for the bottled beverages, and a refrigerant-evaporator in said upper compartment surrounding the tank, said upper and lower compartments communicating to permit free passage of convection currents between said compartments.

2. A refrigerating device including a cabinet formed by insulated top and side walls, said cabinet providing an upper compartment having a tank for containing bottled beverages and the like, a lower dry refrigerating compartment forming a pre-cooler for the bottled beverages, and a refrigerant-evaporator located in the upper compartment and surrounding the tank, said upper and lower compartments communicating to permit free passage of convection currents between the compartments.

3. A refrigerating device comprising a cabinet including insulated top and side walls, said cabinet providing an upper compartment having an immersion tank for containing bottled beverages and the like, a dry refrigerating compartment located below the tank, said upper and lower compartments communicating to permit the free passage of convection currents between compartments, and a refrigerant-evaporator in the form of a cooling coil located in the upper compartment and surrounding the tank, said coil being spaced from the insulated side walls of the cabinet.

4. In a refrigerating device, an upper compartment provided with a tank for containing bottled beverages and the like, a lower dry refrigerating compartment providing a pre-cooler for the bottled beverages, a refrigerant evaporator located in the upper compartment and surrounding the tank, said upper and lower compartments communicating, and means including a motor operated fan for causing a circulation of the air from the lower compartment to the upper compartment and return.

5. A refrigerating device comprising a cabinet including insulated top and side walls, said cabinet providing an upper compartment having an immersion tank for containing bottled beverages and the like, a dry refrigerating compartment below the tank, the side walls of said tank providing a relatively narrow space with respect to the insulated walls of said cabinet, and a refrigerant evaporator in the form of a cooling coil occupying said space and surrounding said tank, said coil having contact with the side walls of the tank at certain locations and being spaced from the walls at points therebetween to localize the formation of ice at these locations, said upper and lower compartment communicating, and means including a motor operated fan for circulating the air in said compartments.

6. In a refrigerating device, an upper compartment provided with a tank for containing bottled beverages and the like, a lower dry refrigerating compartment providing a pre-cooler for the bottled beverages, a refrigerant evaporator in the form of a cooling coil located in the upper compartment and surrounding the tank, and a second cooling coil connecting therewith and being located in said dry refrigerating compartment, said upper and lower compartments communicating to permit the free passage of convection currents and air between compartments.

7. In a refrigerating device, an upper compartment provided with an immersion tank for containing bottled beverages and the like, a lower dry refrigerating compartment providing a pre-cooler for the bottled beverages, a refrigerant evaporator in the form of a cooling coil located in the upper compartment and surrounding the tank, said upper and lower compartments communicating, means including a motor operated fan for circulating the air between compartments, and circulating means located in said tank for circulating the liquid within the tank.

8. In a refrigerating device, an upper compartment provided with an immersion tank for containing bottled beverages and the like, a lower dry refrigerating compartment providing a pre-cooler for the bottled beverages, a refrigerant evaporator in the form of a cooling coil located in the upper compartment and surrounding the tank, said upper and lower compartments communicating, means including a motor operated fan for causing the circulation of air between compartments, and circulating means driven from said fan for circulating the water within the tank.

9. A refrigerating device comprising a cabinet, including insulated top and side walls, said cabinet providing an upper compartment having an immersion tank for containing bottled beverages and the like, a dry refrigerating compartment located below the tank, said upper and lower compartments communicating, a refrigerant evaporator in the form of a cooling coil located in the upper compartment in the space formed by the side walls of the tank and the insulated side walls of the cabinet, and a motor operated fan for positively circulating the air between compartments.

10. A refrigerating device comprising a cabinet, including insulated top and side walls, said cabinet providing an upper compartment having an immersion tank for containing bottled beverages and the like, a dry refrigerating compartment located below the tank, said upper and lower compartments communicating, a refrigerant evaporator in the form of a cooling coil located in the upper compartment in the space formed by the side walls of the tank and the insulated side walls of the cabinet, a motor operated fan for circulating the air between compartments, and circulating means located in said immersion tank for circulating the liquid within the tank, said circulating means being operatively connected with said motor operated fan.

11. A refrigerator comprising a case, a dry cooling compartment having a closure therefor, a wet refrigerating compartment having closures therefor, an annular compartment surrounding the wet refrigerating compartment and communicating with the dry cooling compartment and heat absorbing means disposed within the annular compartment and surrounding the wet refrigerating compartment.

12. A refrigerator comprising a case, a dry pre-cooling compartment having a closure therefor, a wet refrigerating compartment having closures therefor, an annular compartment surrounding the wet refrigerating compartment and communicating with the pre-cooling compartment and a refrigerating unit expansion coil wound around the wet refrigerating compartment within the annular compartment and in contact with the side walls of the wet refrigerating compartment and serving to form both ice and frost upon the inner faces of the side walls of the wet refrigerating compartment.

13. A refrigerator comprising a cabinet, a tank in the cabinet forming a compartment adapted to contain a liquid, a dry cooling compartment formed in the cabinet below the tank and communicating with an upper annular compartment surrounding the tank, and a refrigerating unit expansion coil in the upper annular chamber.

14. A refrigerator comprising a cabinet, a tank in the cabinet adapted to contain a liquid, a pre-cooling compartment in the cabinet below the tank and having an upper annular compartment surrounding the tank, and a refrigerating unit expansion coil in the upper annular compartment surrounding the tank, said coils adapted to cause ice to be formed on the inner faces of the side walls of the tank during operating periods of the refrigerating unit and during idle periods of the refrigerating unit warm air currents within the pre-cooling compartment rise into the upper annular compartment and together with warm air in the tank cause the process of defrosting to take place within the tank so that ice formed on the side walls of the tank, when released therefrom, will be allowed to float in the liquid within the tank.

15. A refrigerator comprising a cabinet including a pre-cooling compartment, a closure for said compartment, a tank adapted to contain a liquid disposed within the upper portion of the pre-cooling compartment and having its side walls spaced from the side walls of the cabinet to provide an annular chamber open at its bottom to the pre-cooling chamber and a refrigerating unit expansion coil disposed within the annular chamber and surrounding the tank to establish ice formation on the inner faces of the side walls of the tank when the unit is in operation, and warm air currents established within the pre-cooling compartment when the unit is not in operation being adapted to rise into the annular chamber to effect defrosting to release the ice formation on the side walls of the tank to float in the liquid within the tank.

16. A refrigerating structure including a cabinet, a dry pre-cooling compartment and a wet refrigerating tank in said cabinet, a side closure for the compartment and a top closure for the tank, and an expansion coil surrounding the wet refrigerating tank and in contact with the side walls and underlying and in heat exchange relation with the bottom thereof and serving to form ice upon the inner faces of the side walls of said tank.

17. In a refrigerating device, the combination of a compartment provided with a tank forming a container for bottled beverages and the like, a refrigerating compartment below said tank and communicating with said first named compartment providing a pre-cooler for the bottled beverages, and heat absorbing means, said means being disposed in part in association with the side of said tank and in part in said refrigerating compartment.

18. In a refrigerating device, the combination of a compartment provided with a tank forming a container for bottled beverages and the like, a refrigerating compartment below said tank and communicating with said first named compartment providing a pre-cooler for the bottled beverages, and heat absorbing means, said means being disposed in part in association with the side and bottom of said tank and in part in said refrigerating compartment.

19. In a refrigerating device, the combination of a compartment provided with a tank forming a container for bottled beverages and the like, heat absorbing means in heat absorbing relation with the side and bottom of said tank, said means and said tank at the side thereof being alternately at a greater distance apart whereby the heat absorption therebetween is accentuated, and a refrigerating compartment communicating with said first named compartment providing a pre-cooler for the bottled beverages.

20. In a refrigerating device, the combination of a compartment provided with a tank forming a container for bottled beverages and the like, heat absorbing means in heat absorbing relation with the side and bottom of said tank, said means and said tank at the side thereof being alternately at a greater distance apart whereby the heat absorption therebetween is accentuated, and a refrigerating compartment communicating with said first named compartment providing a pre-cooler for the bottled beverages, said heat absorbing means being disposed in part in said refrigerating compartment.

21. In a refrigerating device, an upper compartment provided with an immersion tank for containing bottled beverages and the like, a lower dry refrigerating compartment providing a pre-cooler for the bottled beverages, a refrigerant evaporator in the form of a coil associated with said tank, and circulating means for the circulation of air between compartments.

22. In a refrigerating device, the combination of a compartment provided with a tank forming a container for bottled beverages and the like, a refrigerating compartment communicating with said first-named compartment providing a pre-cooler for the bottled beverages, heat absorbing means associated with said tank, and circulating means for the circulation of air between compartments.

23. In a refrigerating device, the combination of a compartment provided with a tank forming a container having a refrigerating medium therein for bottled beverages and the like, a refrigerating compartment communicating with said first-named compartment providing a pre-cooler for the bottled beverages, heat absorbing means associated with said tank, means for circulating the refrigerating medium in said tank, and circulating means for the circulation of air between compartments.

24. In a refrigerating device, the combination of a compartment provided with a tank forming a container for bottled beverages and the like, a refrigerating compartment communicating with said first-named compartment providing a pre-cooler for the bottled beverages, heat absorbing means, said means being associated with said tank and being disposed in said second-named compartment, and circulating means for the circulation of air between compartments.

25. In a refrigerating device, the combination of a compartment provided with a tank forming a container for bottled beverages and the like, a refrigerating compartment communicating with said first-named compartment providing a pre-cooler for the bottled beverages, heat absorbing means, said means being associated with the side and bottom of said tank and being disposed in said second-named compartment, and circulating means for the circulation of air between compartments.

26. In a refrigerating device, the combination of a compartment provided with a tank forming a container having a refrigerating medium therein for bottled beverages and the like, a refrigerating compartment communicating with said first-named compartment providing a pre-cooler for the bottled beverages, heat absorbing means associated with said tank, said means being associated with the side and bottom of said tank and being disposed in said second-named compartment, circulating means for the circulation of air between compartments and means for circulating the refrigerating medium in said tank.

27. In a refrigerating device, the combination of a compartment provided with a wet refrigerating compartment forming a container for bottled beverages and the like, a dry compartment, a refrigerating unit, heat absorbing means, said means extending from said unit to the side of said container in heat transfer relation to cool said beverages by convection through the medium of the liquid in said tank and then extending to underlie the bottom of said tank in heat transfer relation thereto, to cool said beverage by conduction through the medium of said bottom, said means then extending into said dry compartment and returning to said refrigerating unit.

FREDERICK E. HAZARD.